(12) United States Patent
Nicholson et al.

(10) Patent No.: US 10,024,763 B2
(45) Date of Patent: Jul. 17, 2018

(54) EFFICIENT HIGH SPEED UNIFORMITY MEASUREMENTS USING SPEED RAMPS

(71) Applicants: COMPAGNIE GENERALE DES ETABLISSEMENTS MICHELIN, Clermont-Ferrand (FR); MICHELIN RECHERCHE et TECHNIQUE S.A., Granges-Paccot (CH)

(72) Inventors: Verner Steve Nicholson, Pelzer, SC (US); James Michael Traylor, Greer, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 335 days.

(21) Appl. No.: 14/647,995

(22) PCT Filed: Dec. 14, 2012

(86) PCT No.: PCT/US2012/069745
§ 371 (c)(1),
(2) Date: May 28, 2015

(87) PCT Pub. No.: WO2014/092722
PCT Pub. Date: Jun. 19, 2014

(65) Prior Publication Data
US 2015/0300921 A1 Oct. 22, 2015

(51) Int. Cl.
*G01M 17/02* (2006.01)
*G01M 1/22* (2006.01)
*B29D 30/06* (2006.01)

(52) U.S. Cl.
CPC ............ *G01M 17/02* (2013.01); *G01M 1/225* (2013.01); *B29D 2030/0635* (2013.01)

(58) Field of Classification Search
CPC .................. G01M 17/02; G01M 1/225; B29D 2030/0635
See application file for complete search history.

(56) References Cited

U.S. PATENT DOCUMENTS 4,173,850 A   11/1979 Gormish et al.
4,423,632 A *  1/1984 Madden ............... G01M 1/06
                                              73/462

(Continued)

FOREIGN PATENT DOCUMENTS

EP         1239275        9/2002
JP         2001/124666    5/2001
WO     WO 2002/099377   12/2002

OTHER PUBLICATIONS

PCT International Search Report for PCT/US2012/069745, dated Feb. 20, 2013.

*Primary Examiner* — Paul West
*Assistant Examiner* — Xin Zhong
(74) *Attorney, Agent, or Firm* — Dority & Manning, P.A.

(57) ABSTRACT

Methods and systems for improving the uniformity of a tire by determining one or more high speed uniformity parameters of the tire are provided. The high speed uniformity parameters can be determined by continuously acquiring uniformity data while ramping the tire to and from high speeds. For instance, measured uniformity data can be continuously collected for the tire as the tire is increased to high rotational speeds and decreased from high rotational speeds. The measured uniformity data can then be analyzed to determine one or more high speed uniformity parameters for the tire. For instance, the measured uniformity data can be corrected for non-high speed uniformity contributions to the uniformity measurements, such as contributions resulting from non-uniformity of a road wheel use to load the tire during uniformity testing, contributions resulting from mass (Continued)

unbalance of the tire, and contributions from low speed uniformity parameters of the tire.

20 Claims, 7 Drawing Sheets

(56) References Cited

U.S. PATENT DOCUMENTS

| | | |
|---|---|---|
| 6,513,372 B2 | 2/2003 | Anno et al. |
| 6,584,836 B1 | 7/2003 | Shteinhauz et al. |
| 6,609,074 B2 | 8/2003 | Shteinhauz |
| 6,615,144 B2 | 9/2003 | Williams et al. |
| 6,772,626 B1 * | 8/2004 | Engel .................... G01M 1/225 73/146 |
| 7,082,816 B2 | 8/2006 | Zhu |
| 7,213,451 B2 | 5/2007 | Zhu et al. |
| 2002/0124650 A1 * | 9/2002 | Matsumoto ........... G01M 1/045 73/460 |
| 2003/0149542 A1 | 8/2003 | Chang |
| 2004/0020583 A1 * | 2/2004 | Zhu .................... B29D 30/0061 156/110.1 |
| 2005/0081614 A1 | 4/2005 | Zhu |
| 2012/0035757 A1 | 2/2012 | Mawby et al. |
| 2015/0300921 A1 | 10/2015 | Nicholson et al. |

\* cited by examiner

EFFICIENT HIGH SPEED UNIFORMITY MEASUREMENTS USING SPEED RAMPS

FIELD OF THE INVENTION

The present disclosure relates generally to systems and methods for improving tire uniformity, and more particularly to systems and methods for performing efficient high speed uniformity measurements to determine high speed uniformity parameters of a tire using speed ramps.

BACKGROUND OF THE INVENTION

Tire non-uniformity relates to the symmetry (or lack of symmetry) relative to the tire's axis of rotation in certain quantifiable characteristics of a tire. Conventional tire building methods realistically have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations (radial run out (RRO) and lateral run out (LRO)), mass variance, and rolling force variations (radial force variation, lateral force variation and tangential force variation, sometimes also called longitudinal or fore and aft force variation). Uniformity measurement machines often measure the above and other uniformity characteristics by measuring force at a number of points around a tire as the tire is rotated about its axis. Geometric variations are usually measured as deviations from an average dimension. Mass variance measurement is typically limited to mass unbalance, which is the first harmonic component of mass variance. Mass unbalance can be measured statically on a balance device or on a device that rotates the tire with respect to an axis passing through the geometric center of the tire without applying a load to the tire.

Measurement of tire uniformity is typically done for quality control after manufacturing the tire to determine the effect the non-uniformities will have on a vehicle, that is, the vibrations that will be produced by the non-uniformities. The measurement can be used, for example, to reject tires or to sort or grade tires according to the vehicle for which the tire will be used. Correction procedures can also be performed to account for some of the non-uniformities by making adjustments to the manufacturing process. Additional correction techniques can be performed to address non-uniformities of a cured tire including, but not limited to, the addition and/or removal of material to a cured tire and/or deformation of a cured tire.

High speed uniformity of tires has become a growing concern in the automobile industry. High speed uniformity testing can involve performing uniformity measurements while rotating the tire at speeds approximating highway speeds. Uniformity measurements performed as part of high speed uniformity testing are typically performed at multiple discrete rotational speeds. Multiple rotations of the tire can be required at each discrete speed to obtain sufficient data for analyzing high speed uniformity characteristics. As a result, it can require a considerable amount of time (e.g. up to 30 minutes) to cover a larger speed range. Consequently, only a few and fairly widely spaced discrete speeds are typically used for high speed uniformity measurements of a tire.

Thus, a need exists for an improved method of performing high speed uniformity measurements of tires.

SUMMARY OF THE INVENTION

Aspects and advantages of the invention will be set forth in part in the following description, or may be apparent from the description, or may be learned through practice of the invention.

One exemplary aspect of the present disclosure is directed to a method of determining one or more high speed uniformity parameters of a tire. The method includes rotating a tire through a plurality of rotational speeds according to a speed ramp profile. The speed ramp profile specifies increasing the rotational speed of a tire in a first direction to a first rotational speed, such as greater than about 600 rotations per minute, and decreasing the rotational speed of the tire in the first direction from the first rotational speed. The method further includes continuously acquiring measured uniformity data for the tire while rotating the tire according to the speed ramp profile and analyzing the measured uniformity data to determine one or more high speed uniformity parameters for the tire.

In a particular implementation, analyzing the measured uniformity data to determine one or more high speed uniformity parameters for the tire can include correcting for one or more non-high speed uniformity contributions to the measured uniformity data. The one or more non-high speed uniformity contributions can include one or more of a road wheel contribution, a mass unbalance contribution, or a low speed uniformity contribution to the measured uniformity data. In one aspect, correcting for one or more non-high speed uniformity contributions can include modeling the measured uniformity data as a sum of a high speed uniformity term and one or more non-high speed uniformity terms and estimating coefficients for the non-high speed uniformity terms using, for instance, a regression analysis.

Another exemplary aspect of the present disclosure is directed to a system for determining one or more high speed uniformity parameters of a tire. The system can include a tire hub on which a tire is securely mounted for rotation at a plurality of rotational speeds and a measurement machine configured to acquire uniformity data for the tire as the tire is rotated by the tire hub. The system can further include a computer control system coupled to the measurement machine and the tire hub. The computer control system can be configured to control the tire hub to rotate the tire through the plurality of rotational speeds according to a speed ramp profile. The computer control system can be further configured to control the measurement machine to continuously acquire measured uniformity data for the tire while the tire is rotated according to the speed profile. The computer control system can be further configured to analyze the measured uniformity data to determine one or more high speed uniformity parameters for the tire. The speed ramp profile can specify increasing the rotational speed of the tire in a first direction to a first rotational speed and decreasing the rotational speed of the tire in the first direction from the first rotational speed. In a particular implementation, the speed profile can further specify increasing the rotational speed of the tire in a second direction to a second rotational speed and decreasing the rotational speed of the tire in the second direction from the second rotational speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods and systems for improving the uniformity of a tire by determining one or more high speed uniformity parameters for a tire. The high speed uniformity parameters can be determined by continuously acquiring uniformity data while rotating the tire to high speeds (e.g. on the order of 600+ rotations per minute) using speed ramps. The measured uniformity data acquired during the speed ramps can be analyzed to determine one or more high speed uniformity parameters for the tire.

More particularly, a tire can be rotated according to a speed ramp profile. A speed ramp profile specifies varying rotational speeds for the tire over time as the tire is increased and decreased from high rotational speeds. An exemplary speed ramp profile can specify that the rotational speed is increased from about zero rotational speed (i.e. at rest) to a high rotational speed. The speed ramp profile can then specify that the rotational speed is decreased from the high rotational speed to about zero rotational speed. The speed ramp profile can specify varying rotational speeds for both rotational directions of the tire (e.g. clockwise and counterclockwise directions).

Measured uniformity data can be continuously acquired as the tire is rotated through the varying rotational speeds according to the speed ramp profile. The measured uniformity data can include rolling force variation measurements (e.g. RFV, LFV, and TFV measurements), RRO and LRO measurements, or other uniformity measurements. The measured uniformity data can be analyzed in accordance with the techniques disclosed herein to determine one or more high speed uniformity parameters. The high speed uniformity parameters can be used to sort or grade tires based on high speed uniformity characteristics and/or to perform correction techniques to the tire to reduce high speed non-uniformities.

Continuously measuring uniformity data as the tire is rotated according to the speed ramp profile can provide an efficient way of collecting measured uniformity data across a sweeping range of rotational speeds ranging from low rotational speeds to high rotational speeds. The measured uniformity data can be collected in a relatively short period of time, such as in as little as two minutes. Moreover, the measured uniformity data can cover a full range of rotational speeds as opposed to a collection of data at discrete speeds as is typical in the art.

A particular aspect of the present disclosure is directed to correcting for non-high speed uniformity contributions to the measured uniformity data collected while rotating the tire according to the speed ramp profile. These non-high speed uniformity contributions can include mass unbalance contributions, road wheel contributions (e.g. contributions resulting from non-uniformities of a road wheel used to load the tire during high speed uniformity testing), and/or low speed uniformity contributions. Correcting for non-high speed uniformity contributions to the measured uniformity data can result in more accurate high speed uniformity data for determining high speed uniformity parameters.

In one embodiment of the present disclosure, a regression approach can be used to identify non-high speed uniformity contributions to the measured uniformity data. Under the regression approach, the measured uniformity data can be mathematically modeled as a sum of a high speed uniformity term and one or more non-high speed uniformity terms, such as a road wheel term, a mass unbalance term, and/or a low speed uniformity term.

For example, the high speed uniformity data can be modeled according to the following mathematical model:

$$mHSU_i = \sum_{i=1}^{count} \text{road wheel term } (a_p, b_p, i) +$$

-continued $$\omega^2 \sum_{i=1}^{count} \text{mass unbalance term } (c_1, d_1, i) +$$

$$\sum_{i=1}^{count} \text{low speed uniformity term } (e_h, f_h, i) + \varepsilon_i$$

$mHSU_i$ is the measured uniformity data. count is the number of uniformity measurements taken in one full rotation of the tire while rotating the tire according to the speed ramp profile. $a_p$ and $b_p$ are coefficients associated with the road wheel term. $\omega$ is the rotational speed of the tire. $c_1$ and $d_1$ are coefficients associated with the mass unbalance term. $e_h$ and $f_h$ are coefficients associated with the low speed uniformity term. $\varepsilon_i$ is a residual term and can be the high speed uniformity term.

The coefficients $a_p$, $b_p$, $c_1$, $d_1$, $e_h$, and $f_h$ associated with the non-high speed uniformity terms in the mathematical model can be estimated using a regression analysis, such as a linear regression analysis. The regression analysis can estimate coefficients to best fit the mathematical model to the measured uniformity data collected during rotation of the tire according to the speed ramp profile.

Once the coefficients are determined, non-high speed uniformity contributions, such as mass unbalance contributions, can be determined at various rotational speeds from the mathematical model. Corrected high speed uniformity data can also be extracted, for instance, from the residual term $\varepsilon_i$ in the model. The corrected high speed uniformity data can be analyzed to determine one or more high speed uniformity parameters for the tire.

Figure 1:
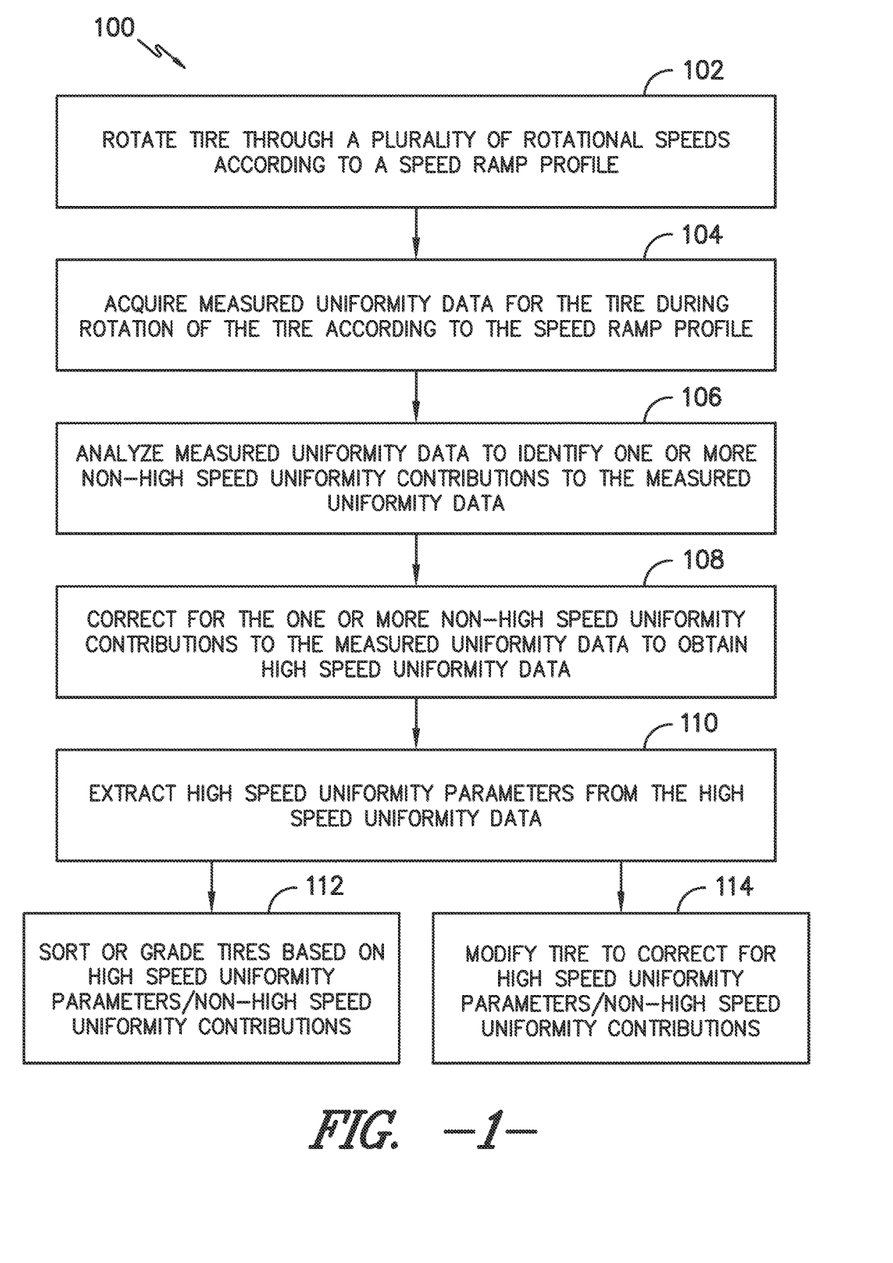
FIG. 1 depicts a flow diagram of an exemplary method of determining one or more high speed uniformity parameters for a tire according to an exemplary embodiment of the present disclosure.

With reference now to the FIGS., exemplary embodiments of the present disclosure will now be discussed in detail. FIG. 1 depicts a flow diagram of an exemplary method (100) for improving tire uniformity by determining one or more high speed uniformity parameters of a tire according to an exemplary embodiment of the present disclosure. Although FIG. 1 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (102), the method includes rotating a tire through a plurality of rotational speeds according to a speed ramp profile. For instance, a tire can be mounted on a hub of a uniformity measurement machine. The hub can be controlled to rotate the tire at high rotational speeds corresponding to highway speeds for the tire, such as rotational speeds of about 600 rotations per minute or greater. The hub can be controlled to increase and decrease the rotational speed of the tire to and from the high rotational speeds according to a speed ramp profile that specifies that varying rotational speeds for the tire over time.

Figure 2:
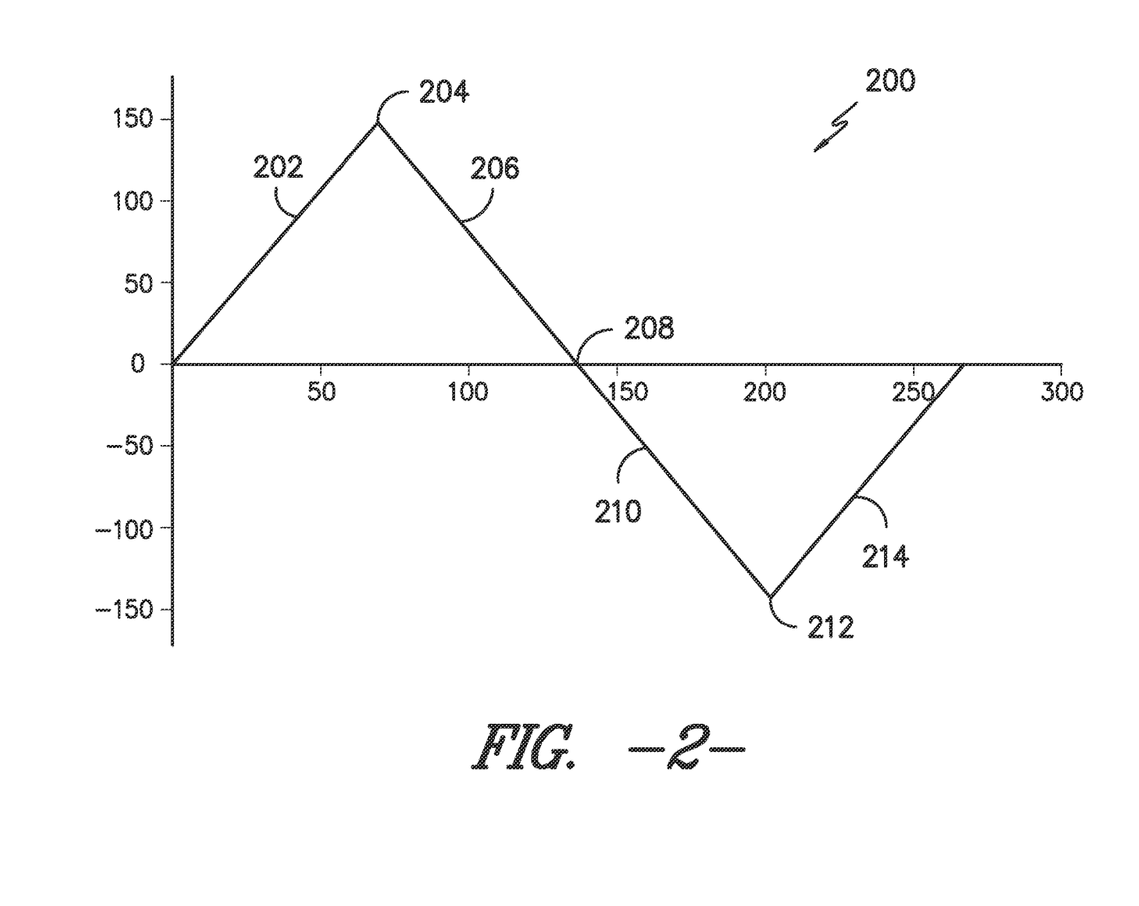
FIG. 2 depicts an exemplary speed ramp profile according to an exemplary embodiment of the present disclosure.

FIG. 2 depicts an exemplary speed ramp profile 200 for determining one or more high speed uniformity parameters for a tire according to an exemplary embodiment of the present disclosure. FIG. 2 plots time in seconds along the abscissa and rotational speed corresponding to highway speed in kilometers per hour along the ordinate. The speed ramp profile 200 specifies increasing the rotational speed of the tire in a first direction (e.g. the clockwise direction) from about zero rotational speed to a first rotational speed 204 according to a speed ramp 202. The first rotational speed 204 can correspond to a highway speed for a tire, such as about 600 rotations per minute or greater. Once the tire is increased to the first rotational speed 204, the speed ramp profile 200 decreases the rotational speed of the tire in the first direction from the first rotational speed 204 to about zero rotational speed 208 according to speed ramp 206.

The speed ramp profile 200 can also specify increasing and decreasing the rotational speed of the tire in a second direction (e.g. the counterclockwise direction). For instance, the speed ramp profile 200 can specify that after the speed ramp 206, the rotational speed of the tire can be increased to a second rotational speed 212 in the second direction according to speed ramp 210. Similar to the first rotational speed 204, the second rotational speed 212 can correspond to a highway speed, such as about 600 rotations per minute or greater. The speed ramp profile can then specify decreasing the rotational speed of the tire from the second rotational speed 212 to about zero rotational speed according to a speed ramp 214.

The speed ramps 202, 206, 210, and 214 are illustrated in FIG. 2 as linear speed ramps. Those of ordinary skill in the art, using the disclosures provided herein, should understand that any suitable speed ramp can be used without deviating from the scope of the present disclosure. For instance, the speed ramps 202, 206, 210, and 214 can be exponential speed ramps, sinusoidal speed ramps, or other suitable speed ramps.

Referring back to FIG. 1 at (104), measured uniformity data can be continuously acquired for the tire during rotation of the tire according to the speed ramp profile. The measured uniformity data can be acquired by a uniformity measurement machine and can include uniformity measurements such as rolling force variation measurements (e.g. RFV, LFV, and TFV), geometric variation measurements (RRO, LRO), and other uniformity measurements. The measured uniformity data can correspond to a number of data points measured at different angular locations about the tire while the tire is rotated according to the speed ramp profile. Given the number of revolutions of the tire that can occur during rotation of the tire according to the speed ramp profile, the measured uniformity data can include many hundreds of data points associated with different angular locations of the tire and at different rotational speeds. Other data that can be collected during rotation of the tire according to the speed ramp profile are tire speed measurements and pulses indicating the number of revolutions of the tire and the road wheel used to load the tire during high speed uniformity testing.

The measured uniformity data can be analyzed to determine one or more high speed uniformity parameters of the tire. According to particular aspects of the present disclosure, it can be desirable to identify high speed uniformity parameters for both rotational directions of the tire (such as for both clockwise and counterclockwise rotation of the tire). This is because certain high speed uniformity parameters, such as high speed rolling force variations, can differ at high speeds depending on the direction of rotation of the tire.

Figure 3:
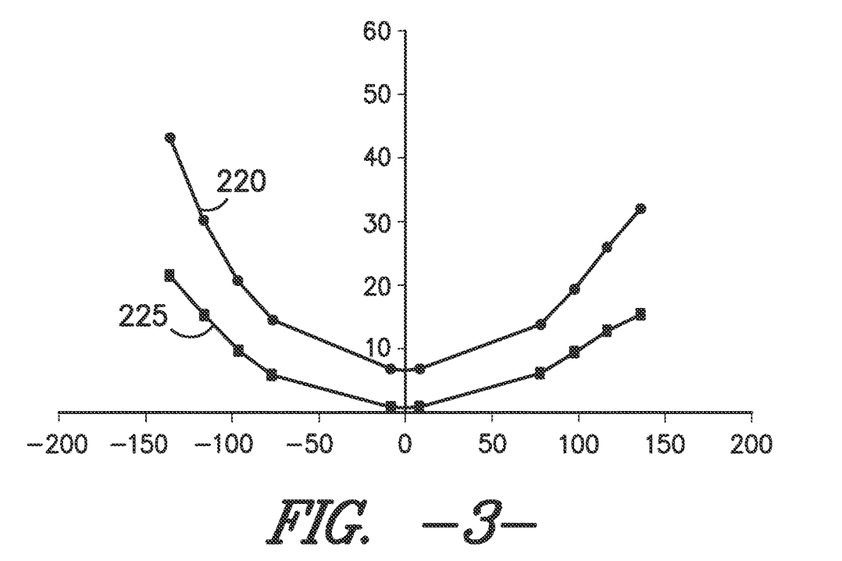
FIG. 3 depicts a graphical representation of radial force variation as a function of speed for both clockwise and counterclockwise rotation of exemplary tires.

In particular, FIG. 3 depicts a graphical representation of radial force variation (RFV) as a function of tire rotational speed for both clockwise and counterclockwise rotation of exemplary tires. FIG. 3 plots tire rotational speed corresponding to road speed in kilometers per hour along the abscissa and radial force along the ordinate. Curve 220 depicts radial force as a function of tire rotational speed for a first exemplary tire. Curve 225 depicts radial force as a function of tire rotational speed for a second exemplary tire.

As demonstrated by curves 220 and 225, the radial force variation of a tire can differ at high rotational speeds depending on the direction of rotation of the tire.

Figure 4:
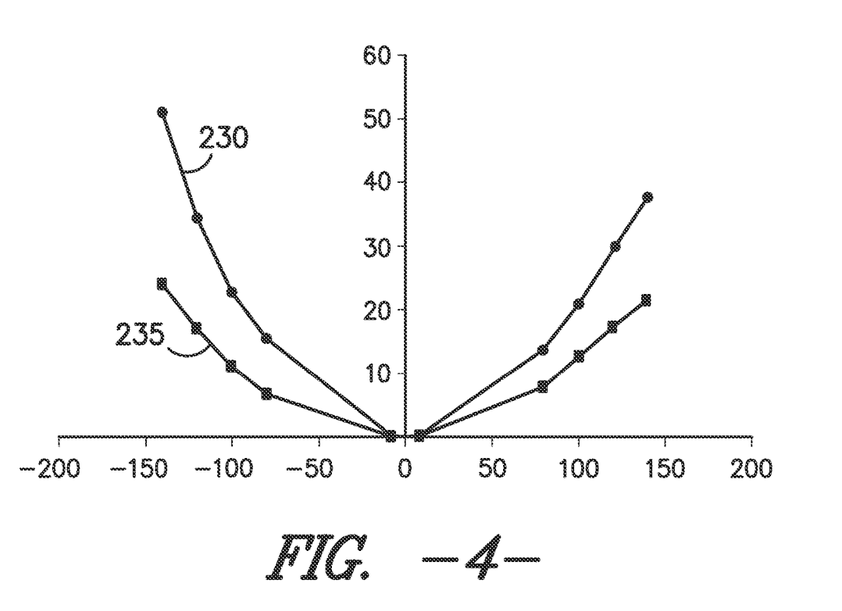
FIG. 4 depicts a graphical representation of tangential force variation as a function of speed for both clockwise and counterclockwise rotation of exemplary tires.

FIG. 4 depicts a graphical representation of tangential force variation (TFV) as a function of tire rotational speed for both clockwise and counterclockwise rotation of exemplary tires. FIG. 4 plots tire rotational speed corresponding to road speed in kilometers per hour along the abscissa and tangential force along the ordinate. Curve 230 depicts tangential force as a function of tire rotational speed or the first exemplary tire. Curve 235 depicts tangential force as a function of tire rotational speed for a second exemplary tire. As demonstrated by curves 230 and 235, the tangential force variation of a tire can differ at high rotational speeds depending on the direction of the tire.

Continuously acquiring measured uniformity data during tire rotation according to the speed profile 200 of FIG. 2 results in acquiring measured uniformity data for both rotational directions of the tire (e.g. both clockwise and counterclockwise rotations). In particular, a first set of measured uniformity data can be continuously acquired when increasing to and decreasing from the first rotational speed 204 according to speed ramps 202 and 206. A second set of measured uniformity data can be continuously acquired when increasing to and decreasing from the second rotational speed 206 according to speed ramps 210 and 214. The first set of measured uniformity data and the second set of measured uniformity data can be analyzed independently to determine one or more high speed uniformity parameters for both rotational directions of the tire.

Referring to FIG. 1 at (106), the method can include analyzing the measured uniformity data to identify one or more non-high speed uniformity contributions to the measured uniformity data. The measured uniformity data can include components that are not attributable to high speed uniformity parameters of the tire. These components can include, for instance, contributions to the measured uniformity data resulting from road wheel non-uniformities, mass unbalance of the tire and hub assembly, and contributions from low speed uniformity parameters.

Figure 5:
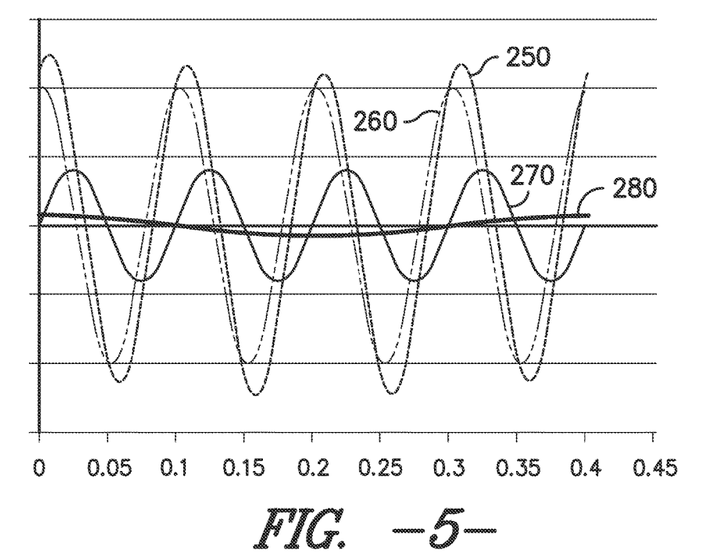
FIG. 5 depicts high speed uniformity and exemplary non-high speed uniformity contributions to uniformity measurements.

For example, FIG. 5 depicts a graphical representation of a portion of an exemplary measured uniformity waveform 250 for a tire. FIG. 5 depicts time in seconds along the abscissa and magnitude of the uniformity parameter along the ordinate. The measured uniformity waveform 250 can be constructed from a set of measured uniformity data for a tire acquired while the tire is rotated according a speed ramp profile. As depicted in FIG. 5, the measured uniformity waveform 250 can actually be a sum of multiple components contributing to the measured uniformity waveform, including a true high speed uniformity component 260, a mass unbalance component 270 and a road wheel component 280. Other non-high speed uniformity components can contribute to the measured uniformity waveform 250, such as a low speed uniformity contribution. It can be desirable to correct the measured uniformity data to correct for contributions resulting from non-high speed uniformity components to identify measured uniformity data attributable to the true high speed uniformity component 260.

Mass unbalance of the tire can affect the measured uniformity data, particularly at high rotational speeds. In particular, as the tire approaches high rotational speeds, mass unbalance can cause radial run out of the tire which can affect high speed uniformity measurements. According to aspects of the present disclosure, the contribution to the measured uniformity data attributable to mass unbalance of the tire can be identified at various rotational speeds and subtracted from the measured uniformity data to provide more accurate high speed uniformity measurements for the tire.

One approach to correcting for mass unbalance can involve performing measurements during a free spin of the tire under unloaded conditions. Measured uniformity data collected during the free spin can be used to predict mass unbalance at various rotational speeds. The predicted mass unbalance can be subtracted from the measured uniformity data to account for the contribution of mass unbalance to the measured uniformity data.

Figure 6:
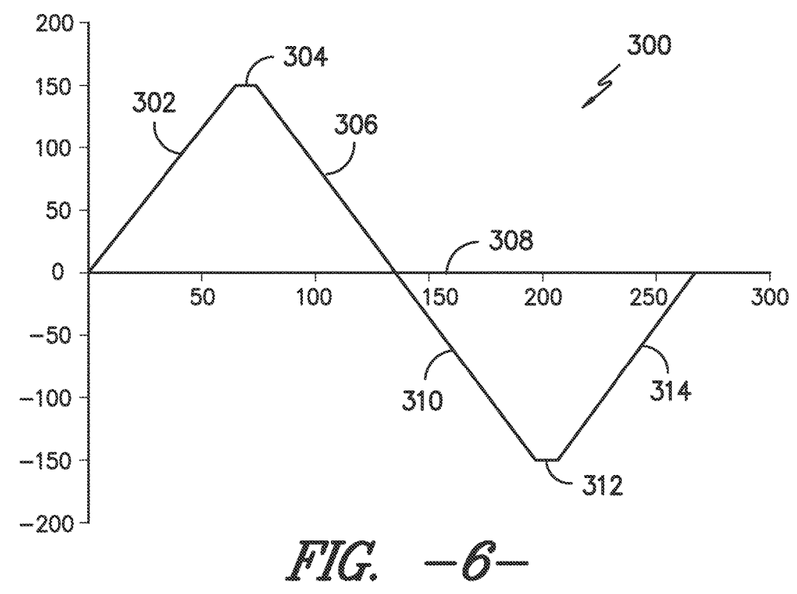
FIG. 6 depicts an exemplary speed ramp profile according to another exemplary embodiment of the present disclosure.

FIG. 6 depicts an exemplary speed ramp profile 300 that can be used to acquire measurements during a free spin of the tire according to an exemplary embodiment of the present disclosure. Similar to the speed ramp profile 200 of FIG. 2, the speed ramp profile 300 of FIG. 6 specifies increasing the rotational speed of the tire in a first direction (e.g. the clockwise direction) from about zero rotational speed to a first rotational speed 304 according to a speed ramp 302. The first rotational speed 304 can correspond to a highway speed for a tire, such as about 600 rotations per minute or greater. The speed ramp profile 300 also specifies decreasing the rotational speed of the tire in the first direction from the first rotational speed 304 to about zero rotational speed 308 according to speed ramp 306. To obtain measured uniformity data for both directions of the tire, the speed ramp profile 300 can also specify increasing the rotational speed of the tire in a second direction (e.g. the counterclockwise direction) from about zero rotational speed to a second rotational speed 312 according to a speed ramp 310 and decreasing the rotational speed of the tire in the second direction from the second rotational speed 312 to about zero rotational speed according to speed ramp 314.

Unlike the speed ramp profile 200 of FIG. 2, however, the speed ramp profile of FIG. 6 can specify free rotation of the tire under an unloaded condition (e.g. a road wheel is not loading the tire) at the first rotational speed 304. This free rotation of the tire can occur for a time period sufficient for multiple revolutions of the tire at the first rotational speed. The speed profile 300 can also specify free rotation of the tire under an unloaded condition at the second rotational speed 312. Measured uniformity data acquired during the free rotation of the tire at the first rotational speed 304 and/or second rotational speed 312 can be used to determine mass unbalance characteristics or the tire.

For example, the mass unbalance contribution to rolling force variation can be determined from rolling force variation uniformity measurements (e.g. RFV, LFV, TFV) performed during the free spin of the tire under unloaded conditions. In particular the mass unbalance contribution can be determined as a value which is speed squared proportional to the free spin value in accordance with the following:

$$F_{Vloaded} = \frac{\omega^2}{v_{free}^2} \times F_{vfree} \qquad (1)$$

$F_{Vloaded}$ is the calculated contribution of mass unbalance at a given rotational speed. $\omega$ is the given rotational speed. $V_{free}$ is the rotational speed of the tire during the free spin of the tire. $F_{Vfree}$ is the rolling force variation measured during the free spin of the tire. $F_{Vloaded}$ and $F_{Vfree}$ are vectors having a magnitude equal to the peak to peak amplitude of the rolling force variation and an azimuth equal to the angular location of the peak rolling force.

Another approach to correcting for mass unbalance can involve performing moment measurements on the tire while the tire is maintained at zero rotational speed (e.g. at rest). In particular, moment measurements can be performed on the tire while the tire is at rest to determine the moment acting on the tire by force of gravity. This measurement can be used to calculate mass unbalance at various rotational speeds. The measured uniformity data can be corrected to account for the mass unbalance at various rotational speeds to provide corrected high speed uniformity data for the tire.

Figure 7:
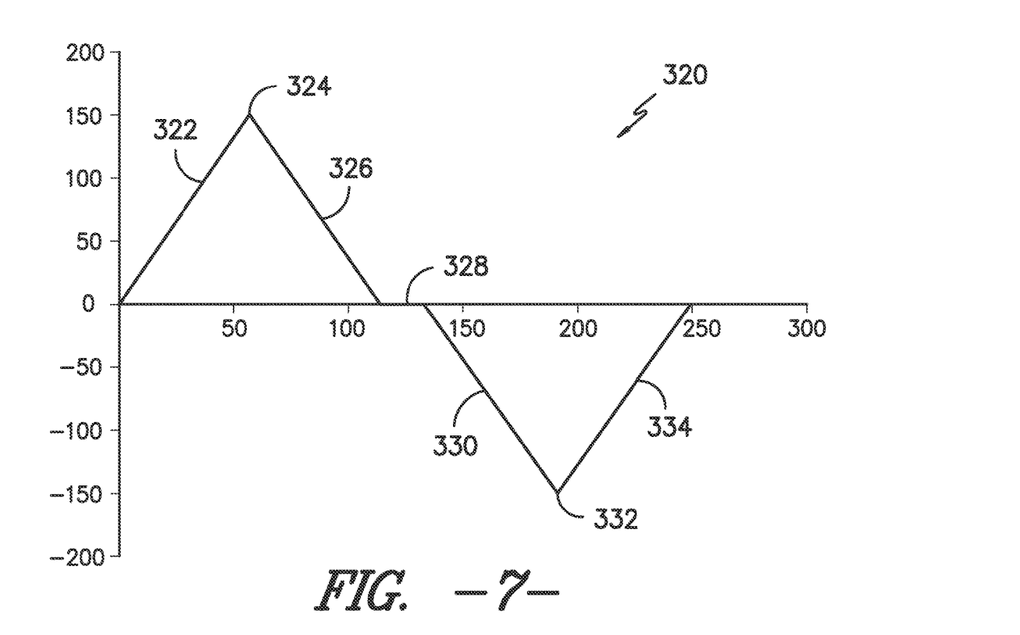
FIG. 7 depicts an exemplary speed ramp profile according to another exemplary embodiment of the present disclosure.

FIG. 7 depicts an exemplary speed ramp profile 320 that can be used to acquire moment measurements while the tire is at rest for identifying mass unbalance contributions to the measured uniformity data according to an exemplary embodiment of the present disclosure. The speed ramp profile 320 specifies increasing the rotational speed of the tire in a first direction (e.g. the clockwise direction) from about zero rotational speed to a first rotational speed 324 according to a speed ramp 322. The first rotational speed 324 can correspond to a highway speed for a tire, such as about 600 rotations per minute or greater. The speed ramp profile 320 can also specify decreasing the rotational speed of the tire in the first direction from the first rotational speed 324 to about zero rotational speed according to speed ramp 326. To obtain measured uniformity data for both directions of the tire, the speed ramp profile 320 can also specify increasing the rotational speed of the tire in a second direction (e.g. the counterclockwise direction) from about zero rotational speed to a second rotational speed 332 according to a speed ramp 330 and decreasing the rotational speed of the tire in the second direction from the second rotational speed 332 to about zero rotational speed according to speed ramp 334.

As illustrated in FIG. 7, the speed ramp profile 320 further specifies maintaining the tire at about zero rotational speed for a static period 328 between speed ramp 326 and speed ramp 330. A moment measurement can be performed during the static period 328 and used to determine mass unbalance characteristics of the tire.

For example, at zero rotational speed, mass unbalance of the tire can manifest itself as a moment by action of gravity. This moment can be converted to an equivalent unbalance by dividing by acceleration due to gravity. This term can be used to determine mass unbalance at a particular rotational speed as follows:

$$F_{Vloaded} = \frac{T_0}{9.8}\omega^2 \quad (2)$$

$F_{Vloaded}$ is the calculated contribution of mass unbalance at a given rotational speed. $T_0$ is the moment measurement during the static period. $\omega$ is the given rotational speed. $F_{Vloaded}$ is a vector having a magnitude equal to the peak to peak amplitude of the rolling force variation and an azimuth equal to the angular location of the peak rolling force. Units for $F_{Vloaded}$, $T_0$, and $\omega$ are newton, newton+meter, and hertz, respectively. The gravitational constant, 9.8, has units of meters/second.

While the above techniques provide good estimates of mass unbalance contributions to the measured uniformity data, the techniques can suffer several drawbacks. For example, additional techniques may have to be used to account for other non-high speed uniformity contributions to the measured uniformity data, such as road wheel contributions and low speed uniformity contributions. In addition, an unbalanced tire can be broken into two components: (1) a rigid component including the hub and rim plus the bead area of the tire; and (2) the deformable part including the remainder of the tire that grows (e.g. increases in radius) due to centrifugation at high rotational speeds. Even with a uniform growth with speed, the mass unbalance contribution coming from the deformable part of the tire can be stronger at high speed than at low speeds.

Figure 9:
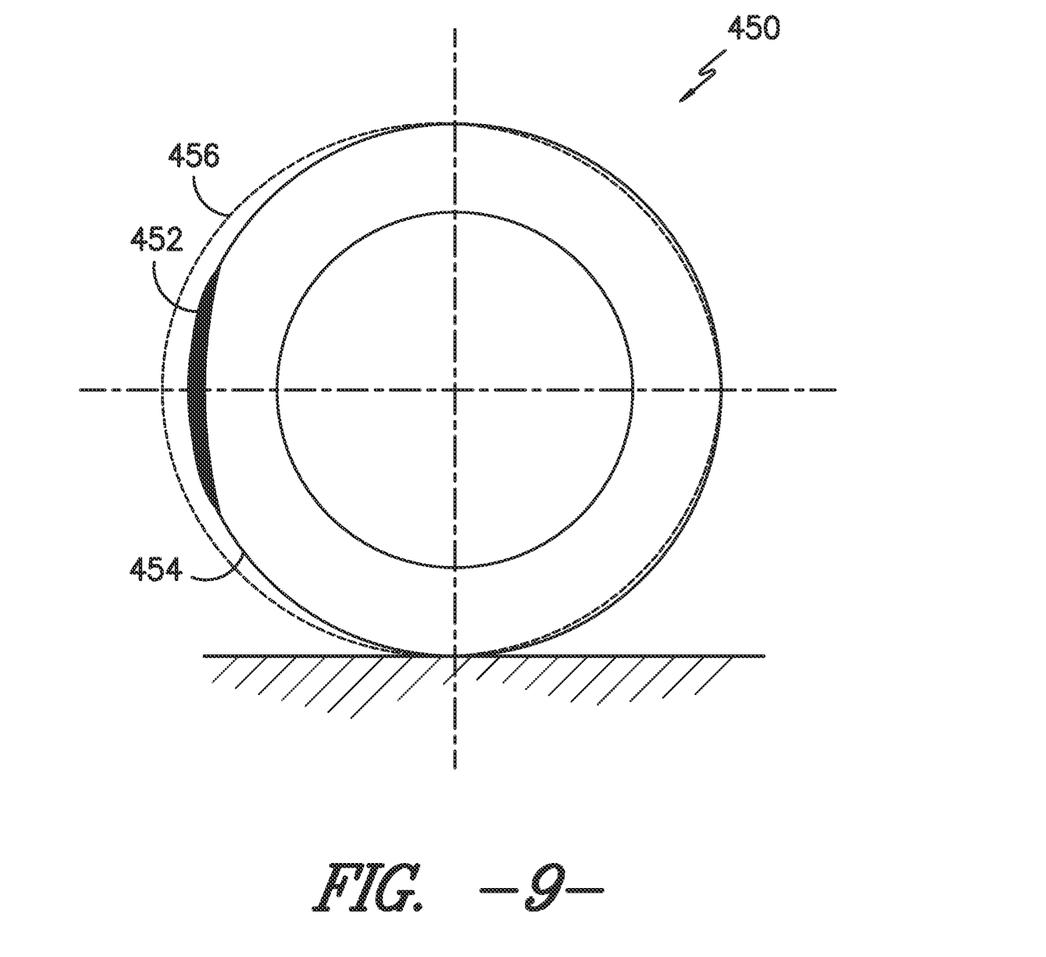
FIG. 9 visually demonstrates the example deformation of a tire having a mass unbalance at high rotational speeds.

FIG. 9 visually demonstrates the example deformation of a tire 450 having a mass unbalance resulting from a mass 452. The outline 454 of the tire 450 provides the tire shape while the tire is not spinning. The outline 456 of the tire 450 provides the tire shape while the tire is spinning at high rotational speeds. Due to centrifugation of the tire at high rotational speeds, the deformable part of the mass 452 grows with high rotational speed as demonstrated by the outline 456 of the tire 450. This growth can significantly affect the high speed uniformity of the tire. A more rigid component of the mass 452 that does not grow from centrifugation of the tire does not significantly contribute to high speed uniformity of the tire.

The mass unbalance contributions resulting from the growth of the deformable part of the tire at high speeds should be included as part of the high speed uniformity data for the tire while mass unbalance contributions resulting from the more rigid components of the tire should not be included as part of the high speed uniformity data for the tire. The free spin and static moment measurement techniques for accounting for mass unbalance, however, can account for mass unbalance resulting from both the deformable part of the tire and the rigid part of the tire. As a result the high speed uniformity data obtained using the free spin or static moment measurement techniques may not include all contributions to high speed uniformity parameters, such as contributions resulting from the deformable part of the mass unbalance system during rotation of the tire at high speeds.

To address these concerns, the mass unbalance contribution in addition to other non-high speed uniformity contributions to the measured uniformity data can be identified using a regression analysis. The regression analysis can properly provide correction for mass unbalance resulting only from the more rigid components of the unbalanced tire system, namely the rigid components of the tire, the rim, the mounting hub, and other components that vary linearly with the square of rotational speed.

Figure 8:
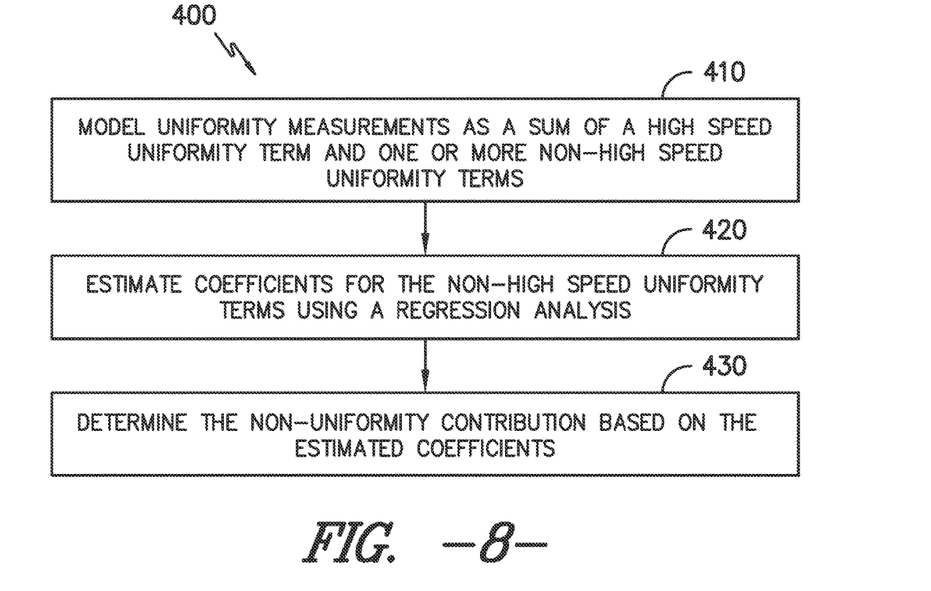
FIG. 8 depicts a flow diagram of identifying non-high speed uniformity contributions to uniformity measurements according to an exemplary embodiment of the present disclosure.

FIG. 8 depicts a flow diagram of an exemplary process (400) for identifying non-high speed uniformity contributions to the measured uniformity data using a regression analysis according to an exemplary embodiment of the present disclosure. At (410), the uniformity measurements are mathematically modeled as a sum of a high speed uniformity term and one or more terms corresponding to non-high speed uniformity contributions to the uniformity measurements. The non-high speed uniformity terms can include coefficients that need to be estimated to mathematically model the uniformity measurements.

At (420), the coefficients associated with the non-high speed uniformity terms are estimated. The coefficients can be estimated using a regression analysis, such as a linear regression analysis. The regression analysis can estimate coefficients to best fit the mathematical model to the measured uniformity data collected during rotation of the tire according to the speed ramp profile.

At (430), the contribution of the non-high speed uniformity components can be determined from the estimated coefficients. For instance, the coefficients can be used to complete the mathematical model so that the contribution of the non-high speed uniformity components to the measured uniformity data at various rotational speeds can be determined from the non-high speed uniformity terms in the mathematical model.

The regression approach of FIG. 8 can be used to determine contributions from multiple non-high speed uniformity components to the measured high speed uniformity data at the same time. For instance, the regression approach of FIG. 8 can be used to identify mass unbalance contributions, road wheel contributions, and/or low speed uniformity contributions. Example regression methods for identifying mass unbalance contributions, road wheel contributions, and low speed uniformity contributions are set forth in detail in the Examples section below.

Referring back to FIG. 1 at (108), once the one or more non-high speed uniformity contributions to the measured uniformity data are identified, the method can include correcting for the one or more non-high speed uniformity contributions to the measured uniformity data to obtain high speed uniformity data more closely associated with high speed uniformity characteristics of the tire. For instance, the identified non-high speed uniformity contributions can be removed (e.g. subtracted) from the measured uniformity data to obtain the high speed uniformity data.

As another example, the measured uniformity data can be corrected by identifying a residual term associated with the high speed uniformity contribution to the measured uniformity data. The residual term can be used as part of a mathematical model for the measured uniformity data. In the case where the mathematical model does not include a term associated with low speed uniformity contributions, the residual term can be associated with both high speed and low speed uniformity characteristics of a tire. Exemplary residual terms associated with high speed uniformity data are provided in the Examples section below.

At (110), high speed uniformity parameters are extracted from the high speed uniformity data. The high speed uniformity parameters can be derived directly from the high speed uniformity data itself or can be obtained by decomposing the high speed uniformity data into various harmonics using a Fourier analysis. For instance, in one implementation, the high speed uniformity parameters can include selected harmonics of high speed rolling force variations, such as selected harmonics of high speed RFV, high speed LFV, or high speed TFV. Other high speed uniformity parameters can include selected harmonics of high speed RRO and LRO.

At (112), the tires can be sorted or graded based on one or more the high speed uniformity parameters and/or based on one or more of the non-high speed uniformity contributions, such as mass unbalance contribution. Alternatively or in addition, the tire can be modified using a correction technique to correct for one or more high speed uniformity parameters and/or non-high speed uniformity contributions (114). For instance, if the magnitude of the one or more high speed uniformity parameters or the mass unbalance of the tire is beyond threshold limits, the tire can be modified to reduce the magnitude of the high speed uniformity parameter and/or to reduce mass unbalance. For instance, material can be removed and/or added to the tire to reduce the magnitude of the high speed uniformity parameter and/or to reduce the mass unbalance of the tire.

Figure 10:
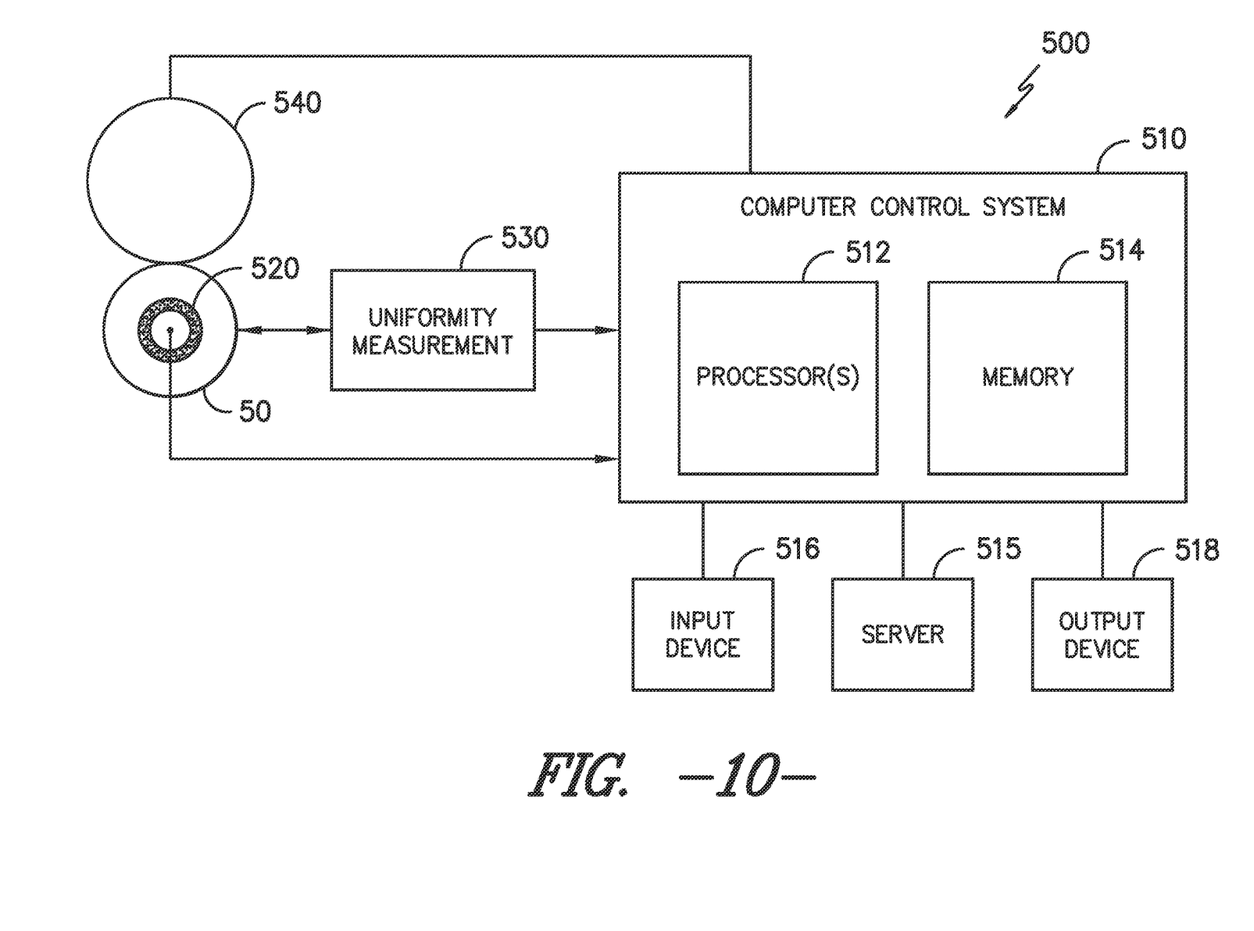
FIG. 10 depicts a block diagram of an exemplary system for determining one or more high speed uniformity parameters according to an exemplary embodiment of the present disclosure.

FIG. 10 depicts an exemplary system 500 for determining one or more high speed uniformity parameters for a tire according to an exemplary embodiment of the present disclosure. The system can include a hub 520 for mounting a tire 50. The tire 50 can be mounted to the hub 520 such that the tire 50 can be rotated with a vertical axis of rotation. The hub 520 can be controlled by a computer control system 510 to rotate the tire pursuant to a speed ramp profile according to an exemplary embodiment of the present disclosure. The system 500 can further include a road wheel 540 that can be brought into contact with tire 50 to load the tire 50 while rotating the tire pursuant to the speed ramp profile.

A measurement machine 530 can be provided to continuously acquire various measured uniformity data as the tire is rotated according to the speed ramp profile, such as the measured uniformity data acquired at (104) of FIG. 1. The measurements obtained by measurement machine 530 can be relayed such that they are received at the computer control system 510. The computer control system 510 can be adapted to control the various components of the system 500, including the rotating hub 520, the measurement machine 530, and the road wheel 540. The computer control system 510 can also be adapted to receive the measured uniformity data and process the measured uniformity data to determine one or more high speed uniformity parameters and/or non-high speed uniformity components, such as mass unbalance components, road wheel components, etc. according to exemplary embodiments of the present disclosure.

The computer control system 510 can include one or more computing devices, which can respectively include one or more processor(s) 512 and a memory 514. Processor(s) 512 can be any suitable processing device and can include, for instance, a microprocessor or other suitable processing device. Memory 514 can include various memory/media elements that can be provided as a single or multiple portions of one or more varieties of non-transitory computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others.

Processor(s) 512 can be configured to receive input data from input device 516 and/or data that is stored in memory 514. Processor(s) 512 can then analyze such data in accordance with the disclosed methods and provide useable output such as data to a user via output device 518. The methodology disclosed herein can alternatively be implemented by one or more servers 515 or across multiple computing and processing devices.

The computer control system 510 of FIG. 9 can be adapted to function as a special-purpose machine providing desired functionality by accessing software instructions rendered in a computer-readable form stored in the memory 514. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

Example Regression Analyses

To better appreciate the advantages of determining high speed uniformity parameters according to exemplary embodiments of the present disclosure, example identification of high speed uniformity data by correcting for non-high speed uniformity contributions to measured uniformity data will now be set forth. In particular, measured uniformity data, such as measured rolling force variation data (e.g. RFV data, LFV data, and/or TFV data) can be continuously acquired while the tire is rotated according to a speed ramp profile, such as the speed ramp profile 200 of FIG. 2. The measured uniformity data can be analyzed in accordance with the examples below to correct for one or more non-high speed uniformity contributions to the measured uniformity data. Example #1 identifies and corrects for road wheel contribution to the measured uniformity data. Example #2 identifies and corrects for road wheel contribution and mass unbalance contribution to the measured uniformity data. Examples #3 and #4 identify and correct for road wheel contribution, mass unbalance contribution, and low speed uniformity contribution to the measured uniformity data.

Example #1

The road wheel contribution to measured uniformity data is identified using a regression analysis and is removed from the measured uniformity data. In particular, the measured uniformity data can be modeled as a sum of a road wheel term and a high speed uniformity term according to the following mathematical model:

$$mHSU_i = \sum_{p=1}^{m} \sum_{i=1}^{count} a_p \cos\left(p \frac{\text{Tire}_{dia}}{RW_{dia}} (i-1) \frac{2\pi}{\text{count}}\right) + b_p \sin\left(p \frac{\text{Tire}_{dia}}{RW_{dia}} (i-1) \frac{2\pi}{\text{count}}\right) + \varepsilon_i$$

$mHSU_i$ is the measured uniformity data. p is the process harmonic to be measured for the road wheel contribution. The mathematical model can model process harmonics 1 through m for the road wheel contribution. count is the number of uniformity measurements taken in a given rotation of the tire. In one example, count can be equal to 1024. $a_p$ and $b_p$ are coefficients associated with the road wheel term. $\varepsilon_i$ is a residual term and can be the high speed uniformity term.

The ratio $$\frac{\text{Tire}_{dia}}{RW_{dia}}$$

provides a ratio of the tire diameter to the road wheel diameter. The ratio $$\frac{\text{Tire}_{dia}}{RW_{dia}}$$

can be determined from encoder pulses indicative of tire/road wheel rotation collected during rotation of the tire and the known diameter of the road wheel $RW_{dia}$ in the case that there is no accurate way of determining the tire diameter.

The coefficients $a_p$ and $b_p$ can be estimated using a regression analysis. The road wheel term can be used to determine the contribution of the road wheel at various harmonics to measured uniformity data. The residual term $\varepsilon_i$ provides the corrected uniformity data without the road wheel contribution. The corrected uniformity data can be associated with both low speed and high speed uniformity characteristics of the tire. Additional techniques can be used to correct for mass unbalance contribution and other non-high speed uniformity contributions to the measured uniformity data. Unlike known techniques for compensating for road wheel contributions (e.g. averaging techniques), estimating road wheel contribution using regression can account for large non-uniformities in the road wheel.

Example #2

The road wheel contribution and the mass unbalance contribution to measured uniformity data is identified using a regression analysis and is removed from the measured uniformity data. In particular, the measured uniformity data can be modeled as a sum of a road wheel term, a mass unbalance term, and a high speed uniformity term according to the following mathematical model:

$$mHSU_i = \sum_{p=1}^{m} \sum_{i=1}^{count} a_p \cos\left(p \frac{\text{Tire}_{dia}}{RW_{dia}} (i-1) \frac{2\pi}{\text{count}}\right) + b_p \sin\left(p \frac{\text{Tire}_{dia}}{RW_{dia}} (i-1) \frac{2\pi}{\text{count}}\right) + $$

$$\omega^2 \sum_{i=1}^{count} c_1 \cos\left(1(i-1) \frac{2\pi}{\text{count}}\right) + d_1 \sin\left(1(i-1) \frac{2\pi}{\text{count}}\right) + \varepsilon_i$$

$mHSU_i$ is the measured uniformity data. p is the process harmonic to be measured for the road wheel contribution. The mathematical model can model process harmonics 1 through m for the road wheel contribution. count is the number of uniformity measurements taken in a given rotation of the tire. In one example, count can be equal to 1024. $a_p$ and $b_p$ are coefficients associated with the road wheel term. $\omega$ is the rotational speed of the tire. $c_1$ and $d_1$ are coefficients associated with the mass unbalance term. $\varepsilon_i$ is a residual term and can be the high speed uniformity term.

The coefficients $a_p$, $b_p$, $c_1$, and $d_1$ can be estimated using a regression analysis. The road wheel term can be used to determine the contribution of the road wheel at various harmonics to the measured uniformity data. The term associated with the coefficients $c_1$ and $d_1$ provides the contribution of the first harmonic of mass unbalance to the measured uniformity data at any given speed $\omega$. In particular, the mass unbalance for any given speed can be obtained by multiplying by $\omega^2$. The residual term $\varepsilon_i$ provides the corrected uniformity data without the road wheel contribution or the mass unbalance contribution. The corrected uniformity data can be associated with both low speed and high speed uniformity characteristics of the tire The corrected uniformity data determined in this manner can simultaneously correct for road wheel contribution and mass unbalance while leaving mass unbalance contributions resulting from deformable aspects of the tire (see FIG. 9) as part of the high speed uniformity data.

Example #3

The road wheel contribution, mass unbalance contribution, and low speed uniformity contribution to measured uniformity data is identified using a regression analysis and is removed from the measured uniformity data. In particular, the measured uniformity data can be modeled as a sum of a road wheel term, a mass unbalance term, a low speed uniformity term, and a high speed uniformity term according to the following mathematical model:

$$mHSU_i =$$

$$\sum_{p=1}^{m} \sum_{i=1}^{count} a_p \cos\left(p \frac{\text{Tire}_{dia}}{RW_{dia}}(i-1)\frac{2\pi}{\text{count}}\right) + b_p \sin\left(p \frac{\text{Tire}_{dia}}{RW_{dia}}(i-1)\frac{2\pi}{\text{count}}\right) +$$

$$\sum_{h=1}^{n} \sum_{i=1}^{count} e_h \cos\left(h(i-1)\frac{2\pi}{\text{count}}\right) + f_h \sin\left(h(i-1)\frac{2\pi}{\text{count}}\right) +$$

$$\omega^2 \sum_{i=1}^{count} c_1 \cos\left(1(i-1)\frac{2\pi}{\text{count}}\right) + d_1 \sin\left(1(i-1)\frac{2\pi}{\text{count}}\right) + \varepsilon_i$$

$mHSU_i$ is the measured uniformity data. p is the process harmonic to be measured for the road wheel contribution. The mathematical model can model process harmonics 1 through m for the road wheel contribution. h is the harmonic to be measured for the low speed uniformity contribution. The mathematical model can model harmonics 1 through n for the low speed uniformity contribution. count is the number of uniformity measurements taken in a given rotation of the tire. In one example, count can be equal to 1024. $a_p$ and $b_p$ are coefficients associated with the road wheel term. $\omega$ is the rotational speed of the tire. $c_1$ and $d_1$ are coefficients associated with the mass unbalance term. $e_h$ and $f_h$ are coefficients associated with the low speed uniformity term. $\varepsilon_i$ is a residual term and can be the high speed uniformity term.

The coefficients $a_p$, $b_p$, $c_1$, $d_1$, $e_h$, and $f_h$ can be estimated using a regression analysis. The road wheel term can be used to determine the contribution of the road wheel at various harmonics to measured uniformity data. The term associated with the coefficients $c_1$ and $d_1$ provides the contribution of the first harmonic of mass unbalance to the measured uniformity data at any given speed $\omega$. In particular, the mass unbalance for any given speed can be obtained by multiplying by $\omega^2$. The low speed uniformity term can be used to determine the contribution of selected harmonics of low speed uniformity to the measured uniformity data. The residual term $\varepsilon_i$ provides the high speed uniformity data without the road wheel contribution, the mass unbalance contribution, or the low speed uniformity contribution.

The high speed uniformity data provided by the residual term $\varepsilon_i$ can reflect how much the tire changes from low speed to high speed, providing better high speed uniformity data for determining one or more high speed uniformity parameters based on uniformity measurements taken across a wide range of rotational speeds. For instance, because measured uniformity data is acquired over a rotational speed range specified by a speed ramp profile that includes low rotational speeds, it can be desirable to remove low speed uniformity contributions from the measured uniformity data and to observe how much the measurement uniformity data changes with speed. The amount the measured uniformity data changes with speed can be an indicator of process variance.

Example #4

The road wheel contribution and low speed uniformity contribution to measured uniformity data is identified by estimating coefficients using a regression analysis. The mass unbalance contribution is estimated using zero speed moment measurements of the tire. The road wheel contribution, low speed uniformity contribution, and mass unbalance contribution can then be removed from the measured uniformity data. In particular, the measured uniformity data can be modeled as a sum of a road wheel term, a mass unbalance term, a low speed uniformity term, and a high speed uniformity term according to the following mathematical model:

$$mHSU_i = \sum_{p=1}^{m} \sum_{i=1}^{count} a_p \cos\left(p \frac{\text{Tire}_{dia}}{RW_{dia}}(i-1)\frac{2\pi}{\text{count}}\right) +$$

$$b_p \sin\left(p \frac{\text{Tire}_{dia}}{RW_{dia}}(i-1)\frac{2\pi}{\text{count}}\right) + \sum_{h=1}^{n} \sum_{i=1}^{count} e_h \cos\left(h(i-1)\frac{2\pi}{\text{count}}\right) +$$

$$f_h \sin\left(h(i-1)\frac{2\pi}{\text{count}}\right) + \frac{T_0 \omega^2}{9.8} \sum_{i=1}^{count} \cos\left(1\left((i-1)\frac{2\pi}{\text{count}} - \theta\right)\right) + \varepsilon_i$$

$mHSU_i$ is the measured uniformity data. p is the process harmonic to be measured for the road wheel contribution. The mathematical model can model process harmonics 1 through m for the road wheel contribution. h is the harmonic to be measured for the low speed uniformity contribution. The mathematical model can model harmonics 1 through n for the low speed uniformity contribution. count is the number of uniformity measurements taken in a given rotation of the tire. In one example, count can be equal to 1024. $a_p$ and $b_p$ are coefficients associated with the road wheel term. $\omega$ is the rotational speed of the tire. $T_0$ is the moment of the tire measured statically at zero rotational speed. $\theta$ is the angle relative to the azimuth of the moment measured statically at zero rotational speed. $e_h$ and $f_h$ are coefficients associated with the low speed uniformity term. $\varepsilon_i$ is a residual term and can be the high speed uniformity term.

The coefficients $a_p$, $b_p$, $e_h$, and $f_h$ can be estimated using a regression analysis. Instead of solving for coefficients for mass unbalance contribution, the mass unbalance contributions can be provided using zero speed estimate $$\frac{T_0 \omega^2}{9.8}$$

obtained from performing a moment measurement of the tire at zero rotational speed. The residual term $\varepsilon_i$ provides the high speed uniformity data without the road wheel contribution, the mass unbalance contribution, or the low speed uniformity contribution.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method of determining one or more high speed uniformity parameters of a tire, the method comprising:
   rotating a tire through a plurality of rotational speeds according to a speed ramp profile, the speed ramp profile specifying increasing the rotational speed of a tire in a first direction to a first rotational speed, and decreasing the rotational speed of the tire in the first direction from the first rotational speed;

continuously acquiring measured uniformity data for the tire while rotating the tire and while the rotational speed of the tire is increasing and decreasing according to the speed ramp profile; and analyzing the measured uniformity data acquired while rotating the tire and while the rotational speed of the tire is increasing and decreasing according to the speed ramp profile to determine one or more high speed uniformity parameters for the tire.

2. The method of claim 1, wherein the speed ramp profile further specifies increasing the rotational speed of the tire in a second direction to a second rotational speed and decreasing the rotational speed of the tire in the second direction from the second rotational speed.

3. The method of claim 2, wherein the first rotational speed and the second rotational speed are greater than about 600 rotations per minute.

4. The method of claim 1, wherein analyzing the measured uniformity data to determine one or more high speed uniformity parameters for the tire comprises correcting for one or more non-high speed uniformity contributions to the measured uniformity data.

5. The method of claim 4, wherein the one or more non-high speed uniformity contributions comprise one or more of a road wheel contribution, a mass unbalance contribution, or a low speed uniformity contribution.

6. The method of claim 4, wherein correcting for one or more non-high speed uniformity contributions comprises:

modeling the measured uniformity data as a sum of a high speed uniformity term and one or more non-high speed uniformity terms; and estimating coefficients for the non-high speed uniformity terms using a regression analysis.

7. The method of claim 4, wherein the speed ramp profile specifies free rotation of the tire under an unloaded condition at the first rotational speed prior to decreasing the rotational speed of the tire in the first direction from the first rotational speed.

8. The method of claim 7, wherein correcting for one or more non-high speed uniformity contributions comprises identifying a mass unbalance contribution from uniformity data acquired during the free rotation of the tire under an unloaded condition.

9. The method of claim 4, wherein the speed profile further specifies maintaining the tire at zero rotational speed between decreasing the rotational speed of the tire in the first direction from the first rotational speed and increasing the rotational speed of the tire in a second direction to a second rotational speed.

10. The method of claim 9, wherein correcting for one or more non-high speed uniformity contributions comprises identifying a mass unbalance contribution from a moment measurement performed while the tire is maintained at zero rotational speed.

11. The method of claim 4, wherein correcting for one or more non-high speed uniformity contributions comprises:

modeling the measured uniformity data as a sum of a high speed uniformity term and a mass unbalance term; and estimating coefficients for the mass unbalance term.

12. The method of claim 4, wherein the correcting for one or more non-high speed uniformity contributions comprises:

modeling the measured uniformity data as a sum of a high speed uniformity term and a road wheel term;

estimating coefficients for the road wheel term.

13. The method of claim 4, wherein the correcting for one or more non-high speed uniformity contributions comprises:

modeling the measured uniformity data as a sum of a high speed uniformity term and a low speed uniformity term; and estimating coefficients for the low speed uniformity term.

14. The method of claim 1, wherein the method further comprises performing a correction technique on the tire based on the one or more high speed uniformity parameters.

15. A system for determining one or more high speed uniformity parameters of a tire, the system comprising:

a tire hub on which a tire is securely mounted for rotation at a plurality of rotational speeds;

a measurement machine configured to acquire uniformity data for the tire as the tire is rotated by said tire hub; and a control system coupled to said measurement machine and said tire hub, said computer control system configured to control said tire hub to rotate the tire through the plurality of rotational speeds according to a speed ramp profile, the control system configured to control said measurement machine to continuously acquire measured uniformity data for the tire while the tire is rotated and while the rotational speed of the tire is increasing and decreasing according to the speed ramp profile, the control system further configured to analyze the measured uniformity data acquired while rotating the tire and while the rotational speed of the tire is increasing and decreasing according to the speed ramp profile to determine one or more high speed uniformity parameters for the tire;

wherein the speed ramp profile specifies increasing the rotational speed of the tire in a first direction to a first rotational speed, and decreasing the rotational speed of the tire in the first direction from the first rotational speed.

16. The system of claim 15, wherein the speed ramp profile further specifies increasing the rotational speed of the tire in a second direction to a second rotational speed and decreasing the rotational speed of the tire in the second direction from the second rotational speed.

17. The system of claim 15, wherein the system comprises a road wheel configured to load the tire during rotation of the tire by said tire hub.

18. The system of claim 17, wherein the control system is configured to analyze the measured uniformity data to determine one or more high speed uniformity parameters by correcting for a mass unbalance contribution and a road wheel contribution to the measured uniformity data.

19. The system of claim 17, wherein the control system is configured to correct for a mass unbalance contribution and a road wheel contribution to the measured uniformity data by:

modeling the measured uniformity data as a sum of a high speed uniformity term, a mass unbalance term, and a road wheel contribution term; and estimating coefficients for the mass unbalance term and the road wheel term.

20. The system of claim 19, wherein the control system is further configured to correct for a low speed uniformity contribution to the measure uniformity data.

* * * * *